US009532066B2

(12) United States Patent
Chien et al.

(10) Patent No.: US 9,532,066 B2
(45) Date of Patent: Dec. 27, 2016

(54) MOTION VECTOR PREDICTION

(75) Inventors: Wei-Jung Chien, San Diego, CA (US); Peisong Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 806 days.

(21) Appl. No.: 13/245,668

(22) Filed: Sep. 26, 2011

(65) Prior Publication Data

US 2012/0189055 A1    Jul. 26, 2012

Related U.S. Application Data

(60) Provisional application No. 61/435,204, filed on Jan. 21, 2011, provisional application No. 61/449,991, filed on Mar. 7, 2011.

(51) Int. Cl.
*H04N 7/26* (2006.01)
*H04N 19/463* (2014.01)
(Continued)

(52) U.S. Cl.
CPC .......... *H04N 19/463* (2014.11); *H04N 19/176* (2014.11); *H04N 19/196* (2014.11);
(Continued)

(58) Field of Classification Search
None
See application file for complete search history.

(56) References Cited

U.S. PATENT DOCUMENTS 7,072,398 B2    7/2006  Ma
7,486,831 B2    2/2009  Choi et al.
(Continued)

FOREIGN PATENT DOCUMENTS

CN    1578469 A    2/2005
CN    1678023 A    10/2005
(Continued)

OTHER PUBLICATIONS

Wang et al., "Variable block-size selection for video transcoding based on macro block motion information," Opt. Eng. 47, 127004 (Dec. 22, 2008); doi:10.1117/1.3041771 (abstract only).
(Continued)

*Primary Examiner* — Frederick Bailey
(74) *Attorney, Agent, or Firm* — Shumaker & Sieffert, P.A.

(57) ABSTRACT

A method of coding video data includes determining a candidate motion vector for each of one or more candidate portions of a video frame and determining a current motion vector for a current portion of a current frame. The current motion vector identifies a portion of a reference frame that at least partially matches the current portion of the current frame. The method also includes calculating a motion vector difference between the current motion vector and each of the candidate motion vectors, selecting one of the candidate motion vectors based on the calculated motion vector differences, signaling an index identifying the candidate portion having the selected one of the candidate motion vectors, and signaling the corresponding motion vector difference calculated with respect to the selected one of the candidate motion vectors.

32 Claims, 9 Drawing Sheets

(51) Int. Cl.
| | |
|---|---|
| *H04N 19/52* | (2014.01) |
| *H04N 19/176* | (2014.01) |
| *H04N 19/70* | (2014.01) |
| *H04N 19/46* | (2014.01) |
| *H04N 19/196* | (2014.01) |
| *H04N 19/61* | (2014.01) |

(52) U.S. Cl.
CPC ............. *H04N 19/46* (2014.11); *H04N 19/52* (2014.11); *H04N 19/61* (2014.11); *H04N 19/70* (2014.11)

(56) References Cited

U.S. PATENT DOCUMENTS

| | | | |
|---|---|---|---|
| 7,660,354 B2 | 2/2010 | Shi et al. | |
| 7,680,186 B2 | 3/2010 | Lee et al. | |
| 7,852,937 B2 | 12/2010 | Hubrich et al. | |
| 8,824,553 B2* | 9/2014 | Ameres et al. | 375/240.16 |
| 9,137,546 B2 | 9/2015 | Won et al. | |
| 2003/0215014 A1 | 11/2003 | Koto et al. | |
| 2006/0280253 A1 | 12/2006 | Tourapis et al. | |
| 2009/0168879 A1* | 7/2009 | Chujoh et al. | 375/240.14 |
| 2009/0316042 A1* | 12/2009 | Liang et al. | 348/441 |
| 2010/0124379 A1 | 5/2010 | Bruna et al. | |
| 2010/0195723 A1 | 8/2010 | Ikai et al. | |
| 2011/0194609 A1* | 8/2011 | Rusert et al. | 375/240.16 |
| 2011/0200112 A1 | 8/2011 | Won et al. | |
| 2011/0206110 A1* | 8/2011 | Bivolarsky et al. | 375/240.01 |
| 2012/0134416 A1* | 5/2012 | Lin et al. | 375/240.16 |
| 2013/0114720 A1* | 5/2013 | Wang et al. | 375/240.16 |

FOREIGN PATENT DOCUMENTS

| | | |
|---|---|---|
| KR | 20100041393 A | 4/2010 |
| WO | 2009041215 A1 | 4/2009 |
| WO | 2010044563 A2 | 4/2010 |
| WO | 2011034148 A1 | 3/2011 |

OTHER PUBLICATIONS

Jung et al., "Adaptive quarter-pel motion estimation and motion vector coding algorithm for the H.264/AVC standard," Opt. Eng. 48, 110502 (Nov. 4, 2009); doi:10.1117/1.3257262.

Jung et al., "Proposition for robust parsing with temporal predictor," Document JCTVC-D197, 4th Meeting: Daegu, KR, Jan. 20-28, 2011, 6 pp.

Anonymous, "Test Model under Consideration," Document: JTCVC-B205, 2nd Meeting: Geneva, CH, Jul. 21-28, 2010.

Bross et al., "CE9: Motion Vector Coding Test Report," JCTVC-D314, WG11 No. m19080, 4th Meeting: Daegu, KR, Jan. 20-28, 2011.

International Search Report and Written Opinion—PCT/US2011/067547—ISA/EPO—May 15, 2012.

Lin et al., "Improved Advanced Motion Vector Prediction," JCTVC-D125, 4th Meeting: Daegu, KR, Jan. 20-28, 2011.

Kim et al., "An Efficient Motion Vector Coding Scheme Based on Minimum Bitrate Prediction," IEEE Transactions on Image Processing, vol. 8, No. 8, Aug. 1999, pp. 1117-1120.

Laroche et al., "A spatio-temporal competing scheme for the rate-distortion optimized selection and coding of motion vectors," Proceedings of the European Signal Processing Conference, Sep. 4, 2006.

Li et al., "Constrained temporal motion vector prediction for error resilience," Document JCTVC-D139, 4th Meeting: Daegu, KR, Jan. 20-28, 2011.

McCann et al., "Samsung's Response to the Call for Proposals on Video Compression Technology," Document: JCTVC-A124, Dresden, DE, Apr. 15-23, 2010, 42 pp.

Su et al., "On Motion Vector Competition," Document: JCRVC-C257, WG11 No. m18298, 3rd Meeting: Guangzhou, CN, Oct. 7-15, 2010.

Tan et al., "Merge/Skip/Direct Simplification," Document: JCTVC-D051, 4th Meeting: Daegu, KR, Jan. 20-28, 2011.

Yang et al., "Motion Vector Coding with Optimal PMV Selection," Document: VCEG-AI22, ITU-T Standardization Sector Study Group 16, Question 6, 35th Meeting: Berlin, Germany, Jul. 16-18, 2008.

Bross et al., "High efficiency video coding (HEVC) text specification draft 6," Joint Collaborative Team on Video Coding, JCTVC-H1003, Nov. 21-30, 2011, 259 pp.

Bross et al., "High efficiency video coding (HEVC) text specification draft 7," Joint Collaborative Team on Video Coding, JCTVC-I1003_D2, Apr. 27-May 7, 2012, 290 pp.

Bross et al., "High efficiency video coding (HEVC) text specification draft 8," Joint Collaborative Team on Video Coding, JCTVC-J1003_D7, Jul. 11-20, 2012, 261 pp.

Bross et al., "WD4: Working Draft 4 of High-Efficiency Video Coding," Joint Collaborative Team on Video Coding, JCTVC-F803_d2, Jul. 14-22, 2011, 226 pp.

Bross et al., "WD5: Working Draft 5 of High-Efficiency Video Coding," Joint Collaborative Team on Video Coding, JCTVC-G1103_d2, Nov. 21-30, 2011, 214 pp.

International Telecommunication Union, "Advanced video coding for generic audiovisual services," Standardization Sector of ITU, Jun. 2011, 674 pp.

Wiegand et al.,"WD1: Working Draft 1 of High-Efficiency Video Coding", Joint Collaborative Team on Video Coding, JCTVC-C403, Oct. 7-15, 2010, 137 pp.

Wiegand et al., "WD3: Working Draft 3 of High-Efficiency Video Coding," Joint Collaborative Team on Video Coding, JCTVC-E603, Mar. 16-23, 2011,193 pp.

Wiegand et al., "WD2: Working Draft 2 of High-Efficiency Video Coding", Joint Collaborative Team on Video Coding, JCTVC-D503, Jan. 20-28, 2011, 153 pp.

Second Written Opinion from International application No. PCT/US2011/067547, dated Dec. 19, 2012, 7 pp.

Kamp et al., "Description of video coding technology proposal by RWTH Aachen University[online]," JCTVC-A112, Apr. 15, 2010,P. 3,URL,http://wftp3.itu.int/av-arch/jctvc-site/2010_04_A_Dresden/JCTVC-A112.doc, 4 pp.

Park et al., "Improvements on median motion vectors of AMVP[online]," JCTVC-D095,Jan. 14, 2011, URL,http://phenix.it-sudparis.eu/jct/doc_end_user/documents/4_Daegu/wg11/JCTVC-D095-v1.zip, 7 pp.

International Preliminary Report on Patentability from International Application No. PCT/US2011/067547, dated Mar. 4, 2013, 12 pp.

Bossen, "Common test conditions and software reference configurations," Document: JCTVC-D600, WG11 No. m19497, Jan. 20-28, 2011; Joint Collaborative Team on Video Coding (JCT-VC) of ITU-T SG16 WP3 and ISO/IEC JTC1/SC29/WG11, 4th Meeting: Daegu, KR, Mar. 17, 2016, 9 pp.

Fujibayashi et al., "CE9 3.2d Simplified Motion vector prediction," JCTVC-D231, Joint Collaborative Team on Video coding (JCT-VC) of ITU-T SG16 WP3 and ISO/IEC JTC1/SC29/WG11, Jan. 20-28, 2011; 4th Meeting: Daegu, KR, Jun. 1, 2011, 5 pp.

Tan et al., "Summary of HEVC working draft 1 and HEVC test model (HM)," Joint Collaborative Team on Video coding (JCT-VC) of ITU-T SG16 WP3 and ISO/IEC JTC1/SC29/WG11, Oct. 7-15, 2010; JCTVC-C405, Guangzhou, CN, Oct. 7, 2010, 2 pp.

Zheng et al., "Extended Motion Vector Prediction for Bi predictive Mode," JCT-VC Meeting; MPEG Meeting; Mar. 16-23, 2011; Geneva, CH; (Joint Collaborative Team on Video Coding of ISO/IEC JTC1/SC29/WG11AND ITU-T SG.16); URL: Http://WFTP3.ITU.INT/AV-ARCH/JCTVC-Site/No. JCTVC-E343, Mar. 11, 2011, 4 pp. XP030008849, ISSN: 0000-0005.

Zheng et al., "Unified Motion Vector Predictor Selection for Merge and AMVP," MPEG Meeting; Mar. 16-23, 2011; Geneva, CH; (Motion Picture Expert Group or ISO/IEC JTC1/SC29/WG11), No. m19932, Mar. 19, 2011, 5 pp., XP030048499.

* cited by examiner

MOTION VECTOR PREDICTION

This application claims the benefit of U.S. Provisional Application No. 61/435,204, filed Jan. 21, 2011, and U.S. Provisional Application No. 61/449,991, filed Mar. 7, 2011, both of which are hereby incorporated by reference in their entirety.

TECHNICAL FIELD

This disclosure relates to video coding, and more particularly to techniques for performing motion vector prediction, motion estimation and motion compensation when coding video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information more efficiently.

Video compression techniques include spatial prediction and/or temporal prediction to reduce or remove redundancy inherent in video sequences. For block-based video coding, a video frame or slice may be partitioned into blocks. Each block can be further partitioned. Blocks in an intra-coded (I) frame or slice are encoded using spatial prediction with respect to reference samples in neighboring blocks in the same frame or slice. Blocks in an inter-coded (P or B) frame or slice may use spatial prediction with respect to reference samples in neighboring blocks in the same frame or slice or temporal prediction with respect to reference samples in other reference frames. Spatial or temporal prediction results in a predictive block for a block to be coded. Residual data represents pixel differences between the original block to be coded and the predictive block.

An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in a particular order to produce a one-dimensional vector of transform coefficients for entropy coding.

SUMMARY

In general, this disclosure describes techniques for coding video data. This disclosure describes techniques for performing motion vector prediction, motion estimation and motion compensation when inter-mode coding (i.e., coding a current block relative to blocks of other frames). In some examples, the techniques may include copying the prediction direction and reference frame index from a neighboring block when coding a current block. In addition, the techniques may include using the motion vector difference between a motion vector for a current block and a motion vector for a neighboring block to allow for more efficient coding.

In one example of the disclosure, a method of encoding video data includes determining a candidate motion vector for each of one or more candidate portions of a video frame and determining a current motion vector for a current portion of a current frame. The current motion vector identifies a portion of a reference frame that at least partially matches the current portion of the current frame. The method also includes calculating a motion vector difference between the current motion vector and each of the candidate motion vectors, selecting one of the candidate motion vectors based on the calculated motion vector differences, signaling an index identifying the candidate portion having the selected one of the candidate motion vectors, and signaling the corresponding motion vector difference calculated with respect to the selected one of the candidate motion vectors.

In another example of the disclosure, an apparatus configured to encode video data is presented. The apparatus comprises a video encoder configured to determine a candidate motion vector for each of one or more candidate portions of a video frame and determine a current motion vector for a current portion of a current frame, wherein the current motion vector identifies a portion of a reference frame that at least partially matches the current portion of the current frame. The video encoder is further configured to calculate a motion vector difference between the current motion vector and each of the candidate motion vectors, select one of the candidate motion vectors based on the calculated motion vector differences, and signal an index identifying the candidate portion having the selected one of the candidate motion vectors, and signal the corresponding motion vector difference calculated with respect to the selected one of the candidate motion vectors.

In another example of the disclosure, a method of decoding video data includes receiving an index identifying a candidate portion of a frame and receiving a motion vector difference, retrieving a candidate motion vector associated with the candidate portion, determining a current motion vector for a current portion of a current frame based on the received motion vector difference and the candidate motion vector, and performing motion compensation on the current portion using the determined current motion vector to produce predictive video data.

In another example of the disclosure, an apparatus configured to decode video data is presented. The apparatus includes a video decoder configured to receive an index identifying a candidate portion of a frame and to receive a motion vector difference. The video decoder is further configured to retrieve a candidate motion vector associated with the candidate portion, determine a current motion vector for a current portion of a current frame based on the received motion vector difference and the candidate motion vector, and perform motion compensation on the current portion using the determined current motion vector to produce predictive video data.

The details of one or more examples are set forth in the accompanying drawings and the description below. Other features, objects, and advantages will be apparent from the description and drawings, and from the claims.

DETAILED DESCRIPTION

Figure 1A:
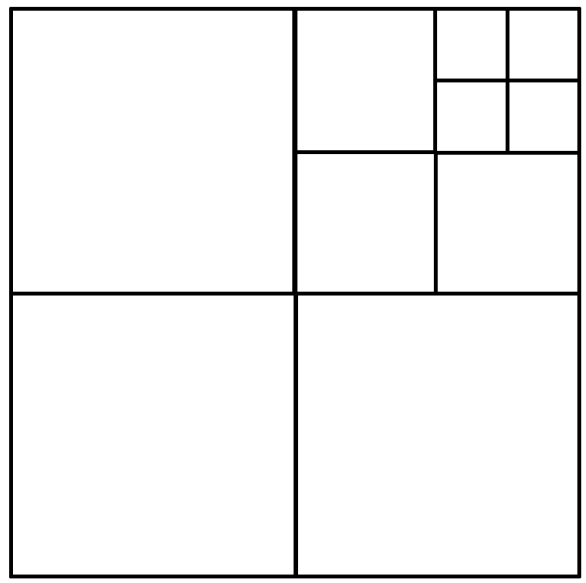
FIGS. 1A and 1B are conceptual diagrams illustrating examples of coding unit splitting.

In general, this disclosure describes techniques for coding video data. This disclosure describes techniques for performing motion estimation and motion compensation when inter-mode coding video data (i.e., coding relative to blocks of other frames). In particular, this disclosure proposes copying the prediction direction and reference frame index from a neighboring block when coding a current block. In addition, this disclosure proposes using the motion vector difference between a motion vector for a current block and a motion vector for a neighboring block to allow for more flexible and efficient coding. Sending a motion vector difference instead of an entire motion vector may result in fewer signaled bits. Furthermore, the use of motion vector difference along with copying the prediction direction and reference frame index provides for efficient reuse of already decoded prediction syntax, while providing for a more accurate reproduction of the motion vector for a current block.

Digital video devices implement video compression techniques to encode and decode digital video information more efficiently. Video compression may apply spatial (intra-frame) prediction and/or temporal (inter-frame) prediction techniques to reduce or remove redundancy inherent in video sequences.

For video coding according to the high efficiency video coding (HEVC) standard currently under development by the Joint Cooperative Team for Video Coding (JCT-VC), as one example, a video frame may be partitioned into coding units. A coding unit (CU) generally refers to an image region that serves as a basic unit to which various coding tools are applied for video compression. A CU usually has a luminance component, denoted as Y, and two chroma components, denoted as U and V. Depending on the video sampling format, the size of the U and V components, in terms of number of samples, may be the same as or different from the size of the Y component. A CU is typically square, and may be considered to be similar to a so-called macroblock, e.g., under other video coding standards such as ITU-T H.264. Coding according to some of the presently proposed aspects of the developing HEVC standard will be described in this application for purposes of illustration. However, the techniques described in this disclosure may be useful for other video coding processes, such as those defined according to H.264 or other standard or proprietary video coding processes.

HEVC standardization efforts are based on a model of a video coding device referred to as the HEVC Test Model (HM). The HM presumes several capabilities of video coding devices over devices according to, e.g., ITU-T H.264/AVC. For example, whereas H.264 provides nine intra-prediction encoding modes, HM provides as many as thirty-four intra-prediction encoding modes.

According to the HM, a CU may include one or more prediction units (PUs) and/or one or more transform units (TUs). Syntax data within a bitstream may define a largest coding unit (LCU), which is a largest CU in terms of the number of pixels. In general, a CU has a similar purpose to a macroblock of H.264, except that a CU does not have a size distinction. Thus, a CU may be split into sub-CUs. In general, references in this disclosure to a CU may refer to a largest coding unit of a picture or a sub-CU of an LCU. An LCU may be split into sub-CUs, and each sub-CU may be further split into sub-CUs. Syntax data for a bitstream may define a maximum number of times an LCU may be split, referred to as CU depth. Accordingly, a bitstream may also define a smallest coding unit (SCU). This disclosure also uses the term "block" or "portion" to refer to any of a CU, PU, or TU. In general, "portion" may refer to any sub-set of a video frame.

An LCU may be associated with a quadtree data structure. FIG. 1A is a conceptual diagram of a quadtree splitting. In general, a quadtree data structure includes one node per CU, where a root node corresponds to the LCU. If a CU is split into four sub-CUs, the node corresponding to the CU includes four leaf nodes, each of which corresponds to one of the sub-CUs. Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, 4 sub-CUs of a leaf-CU will also be referred to as leaf-CUs although there is no explicit splitting of the original leaf-CU. For example if a CU at 16×16 size is not split further, the four 8×8 sub-CUs will also be referred to as leaf-CUs although the 16×16 CU was never split.

Moreover, TUs of leaf-CUs may also be associated with respective quadtree data structures. That is, a leaf-CU may include a quadtree indicating how the leaf-CU is partitioned into TUs. This disclosure refers to the quadtree indicating how an LCU is partitioned as a CU quadtree and the quadtree indicating how a leaf-CU is partitioned into TUs as a TU quadtree. The root node of a TU quadtree generally corresponds to a leaf-CU, while the root node of a CU quadtree generally corresponds to an LCU. TUs of the TU quadtree that are not split are referred to as leaf-TUs.

A leaf-CU may include one or more prediction units (PUs). In general, a PU represents all or a portion of the corresponding CU, and may include data for retrieving a reference sample for the PU. For example, when the PU is inter-mode encoded, the PU may include data defining a motion vector for the PU. The data defining the motion vector may describe, for example, a horizontal component of the motion vector, a vertical component of the motion vector, a resolution for the motion vector (e.g., one-quarter pixel precision or one-eighth pixel precision), a reference frame to which the motion vector points, and/or a reference list (e.g., list 0 or list 1) for the motion vector. Data for the leaf-CU defining the PU(s) may also describe, for example, partitioning of the CU into one or more PUs. Partitioning modes may differ depending on whether the CU is uncoded, intra-prediction mode encoded, or inter-prediction mode encoded. For intra coding, a PU may be treated the same as a leaf transform unit described below.

Figure 1B:
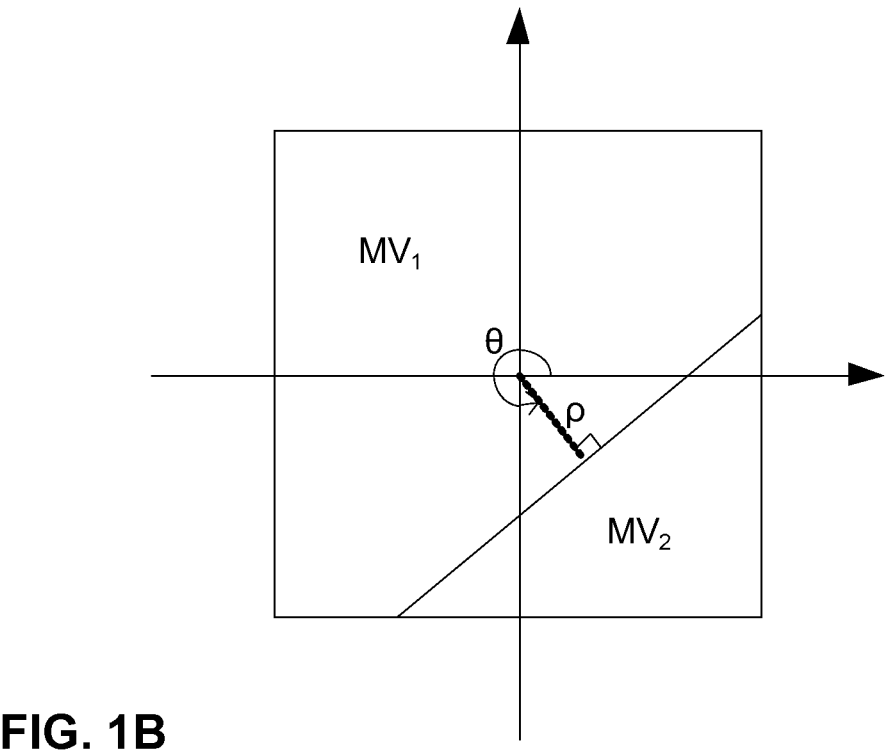

For inter-prediction that involves motion estimation and compensation between video frames, an additional type of splitting has been proposed. This additional type of PU splitting is referred to as geometric splitting or partitioning, which allows for identifying motion boundaries that are not either strictly horizontal and/or vertical. A conceptual diagram of geometric splitting is shown in FIG. 1B. In geometric splitting, the sub-CU is split into two partitions (which may also be referred to as prediction units (PUs)) by a straight line defined as a function of theta ($\theta$) and rho ($\rho$). Theta defines an angle of a line perpendicular to the partition line extending from the center (0, 0) as measured from the x-axis while rho defines the distance or length of this line to the partition line.

Regardless of the type of splitting that is performed, an encoder may perform a process commonly referred to as "motion estimation" to determine a motion vector for each resulting portion (e.g., a PU) formed after splitting the sub-CU. The encoder determines these motion vectors by, as one example, performing what may be referred to as a "motion search" in a reference frame, where the encoder searches for each portion in either a temporally subsequent or future reference frame. Upon finding a portion of the reference frame that best matches the current portion, the encoder determines the current motion vector for the current portion as the difference in the location from the current portion to the matching portion in the reference frame (i.e., from the center of the current portion to the center of the matching portion).

In some conventional examples, an encoder may signal the motion vector for each portion in the encoded video bitstream. The signaled motion vector is used by the decoder to perform motion compensation in order to decode the video data. However, signaling the entire motion vector may results in less efficient coding, as the motion vectors are typically represented by a large number of bits.

In some instances, rather than signal the entire motion vector, the encoder may predict a motion vector for each partition. In performing this motion vector prediction, the encoder may select a set of candidate motion vectors determined for spatially neighboring PUs in the same frame as the current portion or a candidate motion vector determined for a co-located PU in another reference frame. The encoder may perform motion vector prediction rather than signal an entire motion vector to reduce complexity and bit rate in signaling.

Two different modes or types of motion vector prediction are conventionally used. One mode is referred to as a "merge" mode. The other mode is referred to as adaptive motion vector prediction (AMVP). In merge mode, the encoder instructs a decoder, through bitstream signaling of prediction syntax, to copy a motion vector, reference index (identifying a reference frame, in a given reference picture list, to which the motion vector points) and the motion prediction direction (which identifies the reference picture list, i.e., in terms of whether the reference frame temporally precedes or follows the currently frame) from a selected candidate motion vector for a current portion of the frame. This is accomplished by signaling in the bitstream an index identifying the candidate portion having the selected candidate motion vector. Thus, for merge mode, the prediction syntax may include a flag identifying the mode (in this case "merge" mode) and an index identifying the location of the candidate portion. In some instances, the candidate portion will be a causal portion in reference to the current portion. That is, the candidate portion will have already been decoded by the decoder. As such, the decoder has already received and/or determined the motion vector, reference index, and motion prediction direction for the candidate portion. As such, the decoder may simply retrieve the motion vector, reference index, and motion prediction direction associated with the candidate portion from memory and copy these values for the current portion.

In AMVP, the encoder instructs the decoder, through bitstream signaling, to only copy the motion vector from the candidate portion, and signals the reference frame and the prediction direction separately. In AMVP, the motion vector to be copied may be signaled by sending a motion vector difference (MVD). A MVD is the difference between the current motion vector for the current portion and a candidate motion vector for a candidate portion. In this way, the decoder need not use an exact copy of the candidate motion vector for the current motion vector, but may rather use a candidate motion vector that is "close" in value to the current motion vector and add the MVD to reproduce the current motion vector. In most circumstances, the MVD requires fewer bits to signal than the entire current motion vector. As such, AVMP allows for more precise signaling of the current motion vector while maintaining coding efficiency over sending the whole motion vector. In contrast, the merge mode does not allow for the specification of an MVD, and as such, merge mode sacrifices accuracy of motion vector signaling for increased signaling efficiency (i.e., fewer bits). The prediction syntax for AVMP may include a flag for the mode (in this case AMVP), the index for the candidate portion, the MVD between the current motion vector and the candidate motion vector for the candidate portion, the reference index, and the motion prediction direction.

Once motion estimation is performed to determine a motion vector for each of the portions, the encoder compares the matching portion in the reference frame (if a motion search was performed) or the portion of the reference frame identified by the predicted motion vector (if motion vector prediction was performed) to the current portion. This comparison typically involves subtracting the portion (which is commonly referred to as a "reference sample") in the reference frame from the current portion and results in so-called residual data. The residual data indicates pixel difference values between the current portion and the reference sample. The encoder then transforms this residual data from the spatial domain to the frequency domain. Usually, the encoder applies a discrete cosine transform (DCT) to the residual data to accomplish this transformation. The encoder performs this transformation in order to further compress the residual data as the resulting transform coefficients need only be encoded after the transformation rather than the residual data in its entirety.

Typically, the resulting transform coefficients are grouped together in a manner than enables run-length encoding, especially if the transform coefficients are first quantized (rounded). The encoder performs this run-length encoding of the quantized transform coefficients and then performs statistical lossless (or so-called "entropy") encoding to further compress the run-length coded quantized transform coefficients.

After performing lossless statistical coding, the encoder generates a bitstream that includes the encoded video data. This bitstream also includes a number of prediction syntax elements in certain instances that specify whether, for example, motion vector prediction was performed, the motion vector mode, and a motion vector predictor (MVP) index (i.e., the index of the candidate portion with the selected motion vector). The MVP index may also be referred to as its syntax element variable name "mvp_idx."

In a current design being proposed for adoption by the ITU-T/ISO/IEC Joint Collaborative Team on Video Coding (JCT-VC), referred to as high efficiency video coding (HEVC), the encoder performs a number of motion vector prediction modes by which to predict a motion vector for a current portion including 1) AMVP and 2) merge mode described above. These two modes are similar, although AMVP provides for more flexibility in terms of being able to define MVDs, motion prediction directions and reference indices while the merge mode merely copies this motion vector information (i.e., motion vector, motion prediction direction, and reference index) and does not allow for the increased precision of an MVD. Another difference is that AMVP considers temporal candidate motion vectors from co-located PUs in the reference frame and motion vectors from neighboring or adjacent PUs in the current frame, while the merge mode considers only those motion vectors from neighboring or adjacent PUs in the current frame.

Both of these motion vector prediction modes are provided to facilitate signaling of motion information. AMVP reduces costs associated with signaling this motion information by requiring only that the MVD be specified rather than the motion vector itself. Merge mode reduces these same signaling costs even further by signaling only which one of the neighboring spatial candidate motion vectors was selected to copy for the current portion. Yet, merge mode is restrictive in that it only enables specifying the neighboring portion from which the current portion inherits its motion vector and does not permit the flexibility provided by AMVP.

In accordance with the techniques set forth in this disclosure, an additional motion vector prediction mode for coding motion vectors and other prediction syntax is presented. To illustrate, an encoder may determine a candidate motion vector for each of one or more candidate portions. In one example, the candidate portions may be in the same frame as the current portion. The candidate portions may be adjacent portions to the current portion. In particular, the candidate portions may be adjacent portions that are causal to the current portion. That is, the adjacent candidate portions may have already been encoded at the encoder at the time of encoding the current block. Conversely, at the decoder, the adjacent candidate portions are already decoded at the time of decoding the current block. Regardless of the location of the candidate portions, an encoder then determines a current motion vector for the current frame. The encoder may determine this current motion vector by employing a full motion search for a matching portion in the reference frame.

After determining the candidate motion vectors and the current motion vector, the encoder compares the current motion vector to each of the neighboring motion vectors to determine a motion vector difference (MVD). According to a predetermined algorithm, the encoder then selects one of the candidate motion vectors and the associated MVC. In general, the algorithm to select the candidate motion vector may attempt to select the candidate motion vector that produces an MVD that can be represented in the fewest bits. That is, the encoder may select one of the candidate motion vectors such that its corresponding MVD is the smallest (in terms of bits to signal) in comparison to all of the other determined motion vector differences.

In some instances, the disclosed motion vector prediction mode may be implemented such that the encoder restricts application of the motion vector prediction mode to instances where the candidate motion vectors of the candidate portions all refer back to the same reference frame. The techniques may limit the implementation in this respect to avoid having to signal the reference index, as the reference could be inferred from the neighboring motion vectors when all of the neighboring motion vectors refer to the same reference frame.

Figure 2A:
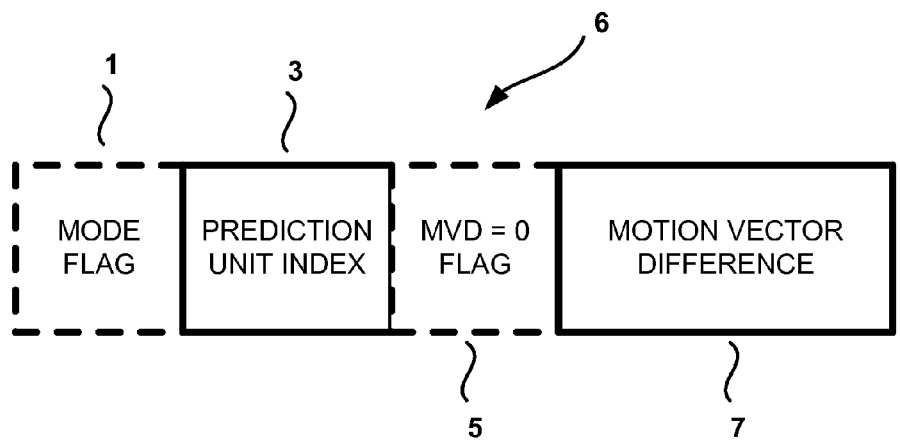
FIGS. 2A and 2B are conceptual diagrams of examples of prediction syntax coding.

FIG. 2A is a conceptual diagram of an example of prediction syntax coding when all candidate motion vectors refer back to the same reference frame. The prediction syntax 6 may include a mode flag 1 indicating the motion vector prediction mode, a prediction unit index 3 identifying the candidate portion having the selected candidate motion vector, and a motion vector difference 7 (i.e., the corresponding MVD determined with respect to the selected candidate motion vector). The mode flag 1 may be optional if the disclosed motion vector prediction mode is the only mode used. That is, the mode flag 1 may be used to differentiate the disclosed motion vector prediction mode from merge mode or AMVP, for example. The prediction syntax 6 may also include an optional MVD=0 flag 5. This flag may be used when the MVD is zero (i.e., the current motion vector and the selected candidate motion vector are identical. This flag may further reduce the bits needed for signaling. Alternatively, the flag may not be used and all zeros may be sent as the MVD 7. This aspect of the disclosure provides a balance between AMVP (where both the reference index and the motion prediction direction need be signaled along with an MVD and an index identifying which of the candidate portions has the selected candidate motion vectors) and merge mode (where nothing but the index identifying the candidate portion having the selected candidate motion vector is signaled).

Figure 2B:
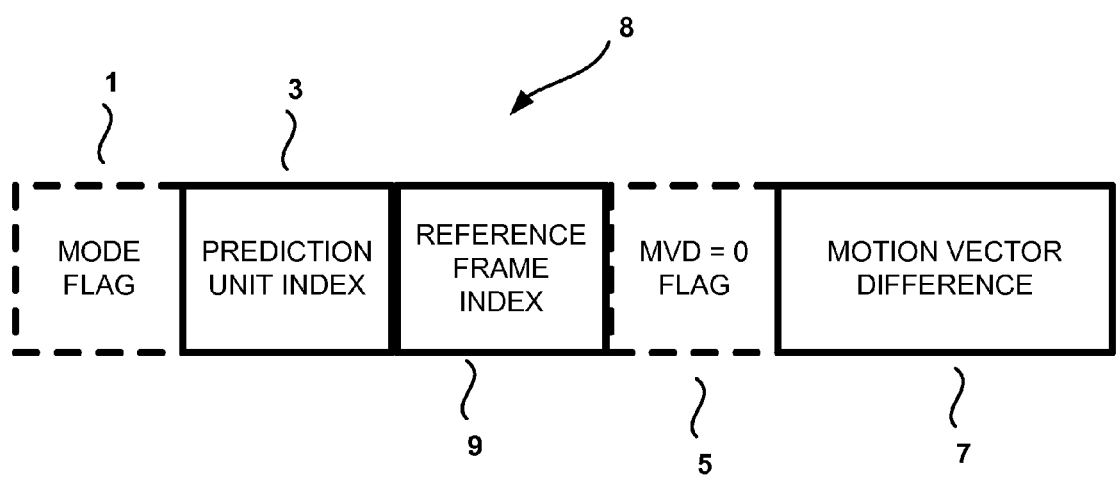

In other instances, this restriction of having the candidate motion vectors point to the same reference may be removed. FIG. 2B is a conceptual diagram of an example of prediction syntax coding when all candidate motion vectors do not refer back to the same reference frame. The prediction syntax 8 may include a mode flag 1 indicating the motion vector prediction mode, a prediction unit index 3 identifying the candidate portion having the selected candidate motion vector, and a motion vector difference 7 (i.e., the corresponding MVD determined with respect to the selected candidate motion vector). In contrast to the example prediction syntax 6 of FIG. 2A, prediction syntax 8 of FIG. 2B further includes a reference frame index 9 identifying the reference frame to which the selected candidate motion vector points. Again, the mode flag 1 may be optional. Also, the prediction syntax 8 may optionally include a MVD=0 flag 5. In this example, the disclosed motion vector prediction mode may become so generic as to subsume both AMVP and merge mode. Elimination of the distinction between these two modes may reduce signaling costs associated with signaling the mode used to perform motion vector prediction, as a single mode would remain.

It should be understood that the prediction syntax 6 of FIG. 2A and the prediction syntax 8 of FIG. 2B are not mutually exclusive and may be used in the same system. In this regard, mode flag 1 may be used to differentiate between the two modes. That is, mode flag 1 would take on different values depending on whether the motion vector prediction mode is restricted to candidate motion vectors that all refer back to the same reference frame or if there is not such restriction.

As will be discussed in more detail below with respect to FIG. 5, a decoder may use the signaled prediction syntax to retrieve the motion vector, motion prediction direction, and reference index to perform motion compensation on the current frame. In general, a decoder may receive the prediction syntax of FIG. 2A that includes the prediction unit index 3 and the motion vector difference 7. A candidate motion vector associated with the candidate portion may be retrieved based on the prediction unit index 3 identifying the candidate portion. In some examples, the candidate portion may be causal to the current portion being decoded (i.e., the candidate portion has already been decoded). As such, the motion vector associated with the candidate portion may be accessed from memory. If the candidate portion is not causal, the decoder waits to retrieve the candidate motion vector associated with the candidate portion until the candidate portion has been decoded.

Once the candidate motion vector has been retrieved, the decoder determines a current motion vector for a current portion based on the received motion vector difference 7 and the retrieved candidate motion vector. That is, the current motion vector may be determined by adding the motion vector difference to the candidate motion vector. In another example, the received motion vector difference may be the MVD=0 flag 5 of FIGS. 2A-2B. In this case, the candidate motion vector associated with the candidate portion is simply copied to the current portion. The decoder may also retrieve the reference index and the motion prediction direction associated with the candidate portion. In some examples, the reference frame index is signaled explicitly instead of having the decoder copy the reference frame index from the reference frame associated with the signaled prediction unit index. (e.g., the example of FIG. 2B). Motion compensation is then performed on the current portion using the determined current motion vector, motion prediction direction, and reference index.

In general, this disclosure proposes a method of encoding video data, the method including determining a candidate motion vector for each of one or more candidate portions of a video frame and determining a current motion vector for a current portion of a current frame. The current motion vector identifies a portion of a reference frame that at least partially matches the current portion of the current frame. The method also includes calculating a motion vector difference between the current motion vector and each of the candidate motion vectors, selecting one of the candidate motion vectors based on the calculated motion vector differences, signaling an index identifying the candidate portion having the selected one of the candidate motion vectors, and signaling the corresponding motion vector difference calculated with respect to the selected one of the candidate motion vectors. This encoding method may be executed by a video encoder.

This disclosure also proposes a method of decoding video data that includes receiving an index identifying a candidate portion of a frame and receiving a motion vector difference, retrieving a candidate motion vector associated with the candidate portion, determining a current motion vector for a current portion of a current frame based on the received motion vector difference and the candidate motion vector, and performing motion compensation on the current portion using the determined current motion vector to produce predictive video data. This decoding method may be executed by a video decoder.

Figure 3:
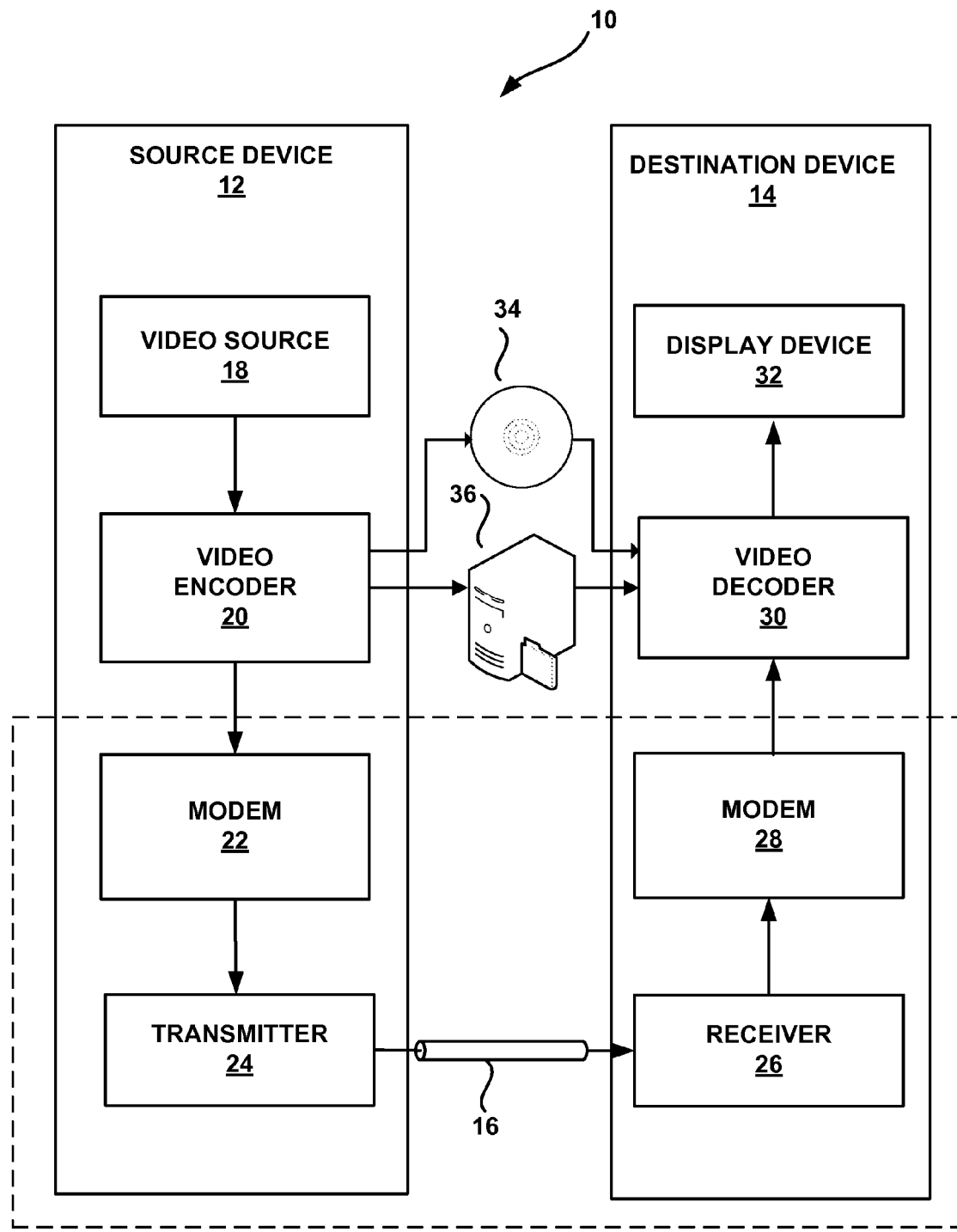
FIG. 3 is a block diagram illustrating an example video encoding and decoding system.

FIG. 3 is a block diagram illustrating an example video encoding and decoding system 10 that may be configured to utilize techniques for motion vector prediction in accordance with examples of this disclosure. As shown in FIG. 3, the system 10 includes a source device 12 that transmits encoded video to a destination device 14 via a communication channel 16. Encoded video data may also be stored on a storage medium 34 or a file server 36 and may be accessed by the destination device 14 as desired. When stored to a storage medium or file server, video encoder 20 may provide coded video data to another device, such as a network interface, a compact disc (CD), Blu-ray or digital video disc (DVD) burner or stamping facility device, or other devices, for storing the coded video data to the storage medium. Likewise, a device separate from video decoder 30, such as a network interface, CD or DVD reader, or the like, may retrieve coded video data from a storage medium and provided the retrieved data to video decoder 30.

The source device 12 and the destination device 14 may comprise any of a wide variety of devices, including desktop computers, notebook (i.e., laptop) computers, tablet computers, set-top boxes, telephone handsets such as so-called smartphones, televisions, cameras, display devices, digital media players, video gaming consoles, or the like. In many cases, such devices may be equipped for wireless communication. Hence, the communication channel 16 may comprise a wireless channel, a wired channel, or a combination of wireless and wired channels suitable for transmission of encoded video data. Similarly, the file server 36 may be accessed by the destination device 14 through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server.

Techniques for motion vector prediction, in accordance with examples of this disclosure, may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, the system 10 may be configured to support one-way or two-way video transmission to support applications such as video streaming, video playback, video broadcasting, and/or video telephony.

In the example of FIG. 3, the source device 12 includes a video source 18, a video encoder 20, a modulator/demodulator 22 and a transmitter 24. In the source device 12, the video source 18 may include a source such as a video capture device, such as a video camera, a video archive containing previously captured video, a video feed interface to receive video from a video content provider, and/or a computer graphics system for generating computer graphics data as the source video, or a combination of such sources. As one example, if the video source 18 is a video camera, the source device 12 and the destination device 14 may form so-called camera phones or video phones. However, the techniques described in this disclosure may be applicable to video coding in general, and may be applied to wireless and/or wired applications, or application in which encoded video data is stored on a local disk.

The captured, pre-captured, or computer-generated video may be encoded by the video encoder 20. The encoded video information may be modulated by the modem 22 according to a communication standard, such as a wireless communication protocol, and transmitted to the destination device 14 via the transmitter 24. The modem 22 may include various mixers, filters, amplifiers or other components designed for signal modulation. The transmitter 24 may include circuits designed for transmitting data, including amplifiers, filters, and one or more antennas.

The captured, pre-captured, or computer-generated video that is encoded by the video encoder 20 may also be stored onto a storage medium 34 or a file server 36 for later consumption. The storage medium 34 may include Blu-ray discs, DVDs, CD-ROMs, flash memory, or any other suitable digital storage media for storing encoded video. The encoded video stored on the storage medium 34 may then be accessed by the destination device 14 for decoding and playback.

The file server 36 may be any type of server capable of storing encoded video and transmitting that encoded video to the destination device 14. Example file servers include a web server (e.g., for a website), an FTP server, network attached storage (NAS) devices, a local disk drive, or any other type of device capable of storing encoded video data and transmitting it to a destination device. The transmission of encoded video data from the file server 36 may be a streaming transmission, a download transmission, or a combination of both. The file server 36 may be accessed by the destination device 14 through any standard data connection, including an Internet connection. This may include a wireless channel (e.g., a Wi-Fi connection), a wired connection (e.g., DSL, cable modem, Ethernet, USB, etc.), or a combination of both that is suitable for accessing encoded video data stored on a file server.

The destination device 14, in the example of FIG. 3, includes a receiver 26, a modem 28, a video decoder 30, and a display device 32. The receiver 26 of the destination device 14 receives information over the channel 16, and the modem 28 demodulates the information to produce a demodulated bitstream for the video decoder 30. The information communicated over the channel 16 may include a variety of syntax information generated by the video encoder 20 for use by the video decoder 30 in decoding video data. Such syntax may also be included with the encoded video data stored on the storage medium 34 or the file server 36. Each of the video encoder 20 and the video decoder 30 may form part of a respective encoder-decoder (CODEC) that is capable of encoding or decoding video data.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In the example of FIG. 3, the communication channel 16 may comprise any wireless or wired communication medium, such as a radio frequency (RF) spectrum or one or more physical transmission lines, or any combination of wireless and wired media. The communication channel 16 may form part of a packet-based network, such as a local area network, a wide-area network, or a global network such as the Internet. The communication channel 16 generally represents any suitable communication medium, or collection of different communication media, for transmitting video data from the source device 12 to the destination device 14, including any suitable combination of wired or wireless media. The communication channel 16 may include routers, switches, base stations, or any other equipment that may be useful to facilitate communication from the source device 12 to the destination device 14.

The video encoder 20 and the video decoder 30 may operate according to a video compression standard, such as the High Efficiency Video Coding (HEVC) standard presently under development, and may conform to the HEVC Test Model (HM). Alternatively, the video encoder 20 and the video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples include MPEG-2 and ITU-T H.263.

Although not shown in FIG. 3, in some aspects, the video encoder 20 and the video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder (CODEC) in a respective device.

The video encoder 20 may implement any or all of the techniques of this disclosure for motion vector prediction in a video encoding process. Likewise, the video decoder 30 may implement any or all of these techniques motion vector prediction in a video coding process. A video coder, as described in this disclosure, may refer to a video encoder or a video decoder. Similarly, a video coding unit may refer to a video encoder or a video decoder. Likewise, video coding may refer to video encoding or video decoding.

In one example of the disclosure, the video encoder 20 of the source device 12 may be configured to determine a candidate motion vector for each of one or more candidate portions of a video frame, determine a current motion vector for a current portion of a current frame, wherein the current motion vector identifies a portion of a reference frame that at least partially matches the current portion of the current frame, calculate a motion vector difference between the current motion vector and each of the candidate motion vectors, select one of the candidate motion vectors based on the calculated motion vector differences, and signal an index identifying the candidate portion having the selected one of the candidate motion vectors, and signal the corresponding motion vector difference calculated with respect to the selected one of the candidate motion vectors.

In another example of the disclosure, the video decoder 30 of the destination device 14 may be configured to receive an index identifying a candidate portion of a frame and receive a motion vector difference, retrieve a candidate motion vector associated with the candidate portion, determine a current motion vector for a current portion of a current frame based on the received motion vector difference and the candidate motion vector, and perform motion compensation on the current portion using the determined current motion vector to produce predictive video data.

Figure 4:
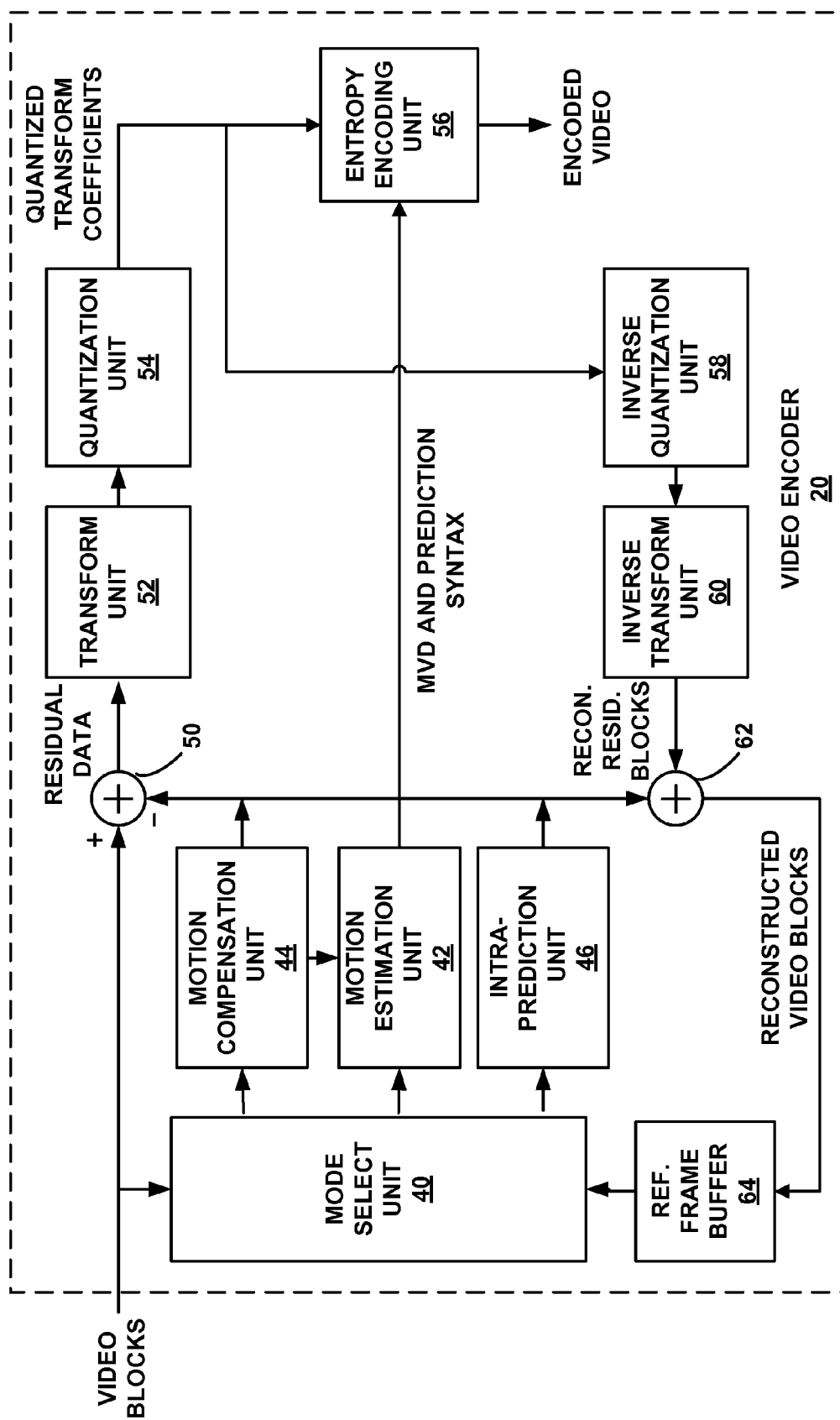
FIG. 4 is a block diagram illustrating an example video encoder.

FIG. 4 is a block diagram illustrating an example of a video encoder 20 that may use techniques for motion vector prediction as described in this disclosure. The video encoder 20 will be described in the context of HEVC coding for purposes of illustration, but without limitation of this disclosure as to other coding standards or methods that may require scanning of transform coefficients. The video encoder 20 may perform intra- and inter-coding of CUs within video frames. Intra-coding relies on spatial prediction to reduce or remove spatial redundancy in video data within a given video frame. Inter-coding relies on temporal prediction to reduce or remove temporal redundancy between a current frame and previously coded frames of a video sequence. Intra-mode (I-mode) may refer to any of several spatial-based video compression modes. Inter-modes such as uni-directional prediction (P-mode) or bi-directional prediction (B-mode) may refer to any of several temporal-based video compression modes.

As shown in FIG. 4, the video encoder 20 receives a current video block within a video frame to be encoded. In the example of FIG. 4, the video encoder 20 includes a motion compensation unit 44, a motion estimation unit 42, an intra-prediction unit 46, a reference frame buffer 64, a summer 50, a transform unit 52, a quantization unit 54, and an entropy encoding unit 56. The transform unit 52 illustrated in FIG. 5 is the unit that applies the actual transform or combinations of transform to a block of residual data, and is not to be confused with block of transform coefficients, which also may be referred to as a transform unit (TU) of a CU. For video block reconstruction, the video encoder 20 also includes an inverse quantization unit 58, an inverse transform unit 60, and a summer 62. A deblocking filter (not shown in FIG. 4) may also be included to filter block boundaries to remove blockiness artifacts from reconstructed video. If desired, the deblocking filter would typically filter the output of the summer 62.

During the encoding process, the video encoder 20 receives a video frame or slice to be coded. The frame or slice may be divided into multiple video blocks, e.g., largest coding units (LCUs). The motion estimation unit 42 and the motion compensation unit 44 perform inter-predictive coding of the received video block relative to one or more blocks in one or more reference frames to provide temporal compression. The intra-prediction unit 46 may perform intra-predictive coding of the received video block relative to one or more neighboring blocks in the same frame or slice as the block to be coded to provide spatial compression.

The mode select unit 40 may select one of the coding modes, intra or inter, e.g., based on error (i.e., distortion) results for each mode, and provides the resulting intra- or inter-predicted block (e.g., a prediction unit (PU)) to the summer 50 to generate residual block data and to the summer 62 to reconstruct the encoded block for use in a reference frame. Summer 62 combines the predicted block with inverse quantized, inverse transformed data from inverse transform unit 60 for the block to reconstruct the encoded block, as described in greater detail below. Some video frames may be designated as I-frames, where all blocks in an I-frame are encoded in an intra-prediction mode. In some cases, the intra-prediction unit 46 may perform intra-prediction encoding of a block in a P- or B-frame, e.g., when motion search performed by the motion estimation unit 42 does not result in a sufficient prediction of the block.

The motion estimation unit 42 and the motion compensation unit 44 may be highly integrated, but are illustrated separately for conceptual purposes. Motion estimation (or motion search) is the process of generating motion vectors, which estimate motion for video blocks. A motion vector, for example, may indicate the displacement of a prediction unit in a current frame relative to a reference sample of a reference frame. The motion estimation unit 42 calculates a motion vector for a prediction unit of an inter-coded frame by comparing the prediction unit to reference samples of a reference frame stored in the reference frame buffer 64. A reference sample may be a block that is found to closely match the portion of the CU including the PU being coded in terms of pixel difference, which may be determined by sum of absolute difference (SAD), sum of squared difference (SSD), or other difference metrics. The reference sample may occur anywhere within a reference frame or reference slice, and not necessarily at a block (e.g., coding unit) boundary of the reference frame or slice. In some examples, the reference sample may occur at a fractional pixel position.

The motion estimation unit 42 sends the calculated motion vector to the entropy encoding unit 56 and the motion compensation unit 44. The portion of the reference frame identified by a motion vector may be referred to as a reference sample. The motion compensation unit 44 may calculate a prediction value for a prediction unit of a current CU, e.g., by retrieving the reference sample identified by a motion vector for the PU.

In accordance with techniques of this disclosure, once the motion estimation unit 42 has determined the current motion vector for a current portion, the motion estimation unit 42 compares the current motion vector to motion vectors in each or one or more candidate portions (i.e., candidate motion vectors). A motion vector difference between the current motion vector and each of the candidate motion vectors is calculated. A particular candidate motion vector is selected, for example, based on some criteria of its associated motion vector difference. For example, the candidate motion vector that produces the smallest MVD may be selected.

Once a candidate motion vector is selected, the motion estimation unit 42 may signal the associated MVD and associated prediction syntax in the encoded bitstream. In one example, each of the candidate portions is restricted to those candidate portions that have a motion vector that points to the same reference frame. In this example, the motion estimation unit 42 signals an index identifying the candidate portion having the selected motion vector and the MVD. A decoder may then copy the remaining prediction syntax (i.e., the reference index and the motion prediction direction) from the candidate portion having the selected motion vector. Additionally, a mode flag indication the disclosed motion vector prediction method has been used may also be signaled. Optionally, a MVD=0 flag may be signaled instead of the MVD in circumstances where the MVD is zero (i.e., the current motion vector exactly matches the selected candidate motion vector). As described above, FIG. 2A shows a conceptual example of signaling for this example.

In another example, the motion vectors for candidate portions are not restricted to only pointing to the same reference frame. In this case, a reference frame index is also signaled. As described above, FIG. 2B shows a conceptual example of this signaling.

In this context, signaling the motion vector difference and other prediction syntax in the encoded bitstream does not require real-time transmission of such elements from the encoder to a decoder, but rather means that such syntax elements are encoded into the bitstream and are made accessible to the decoder in any fashion. This may include real-time transmission (e.g., in video conferencing) as well as storing the encoded bitstream on a computer-readable medium for future use by a decoder (e.g., in streaming, downloading, disk access, card access, DVD, Blu-ray, etc.).

The intra-prediction unit 46 may intra-predict the received block, as an alternative to inter-prediction performed by the motion estimation unit 42 and the motion compensation unit 44. The intra-prediction unit 46 may predict the received block relative to neighboring, previously coded blocks, e.g., blocks above, above and to the right, above and to the left, or to the left of the current block, assuming a left-to-right, top-to-bottom encoding order for blocks. The intra-prediction unit 46 may be configured with a variety of different intra-prediction modes. For example, the intra-prediction unit 46 may be configured with a certain number of directional prediction modes, e.g., thirty-four directional prediction modes, based on the size of the CU being encoded.

The intra-prediction unit 46 may select an intra-prediction mode by, for example, calculating error values for various intra-prediction modes and selecting a mode that yields the lowest error value. Directional prediction modes may include functions for combining values of spatially neighboring pixels and applying the combined values to one or more pixel positions in a PU. Once values for all pixel positions in the PU have been calculated, the intra-prediction unit 46 may calculate an error value for the prediction mode based on pixel differences between the PU and the received block to be encoded. The intra-prediction unit 46 may continue testing intra-prediction modes until an intra-prediction mode that yields an acceptable error value is discovered. The intra-prediction unit 46 may then send the PU to the summer 50.

The video encoder 20 forms a residual block by subtracting the prediction data calculated by the motion compensation unit 44 or the intra-prediction unit 46 from the original video block being coded. The summer 50 represents the component or components that perform this subtraction operation. The residual block may correspond to a two-dimensional matrix of pixel difference values, where the number of values in the residual block is the same as the number of pixels in the PU corresponding to the residual block. The values in the residual block may correspond to the differences, i.e., error, between values of co-located pixels in the PU and in the original block to be coded. The differences may be chroma or luma differences depending on the type of block that is coded.

The transform unit 52 may form one or more transform units (TUs) from the residual block. The transform unit 52 selects a transform from among a plurality of transforms. The transform may be selected based on one or more coding characteristics, such as block size, coding mode, or the like. The transform unit 52 then applies the selected transform to the TU, producing a video block comprising a two-dimensional array of transform coefficients.

The transform unit 52 may send the resulting transform coefficients to the quantization unit 54. The quantization unit 54 may then quantize the transform coefficients. The entropy encoding unit 56 may then perform a scan of the quantized transform coefficients in the matrix according to a scanning mode. This disclosure describes the entropy encoding unit 56 as performing the scan. However, it should be understood that, in other examples, other processing units, such as the quantization unit 54, could perform the scan.

Once the transform coefficients are scanned into the one-dimensional array, the entropy encoding unit 56 may apply entropy coding such as CAVLC, CABAC, syntax-based context-adaptive binary arithmetic coding (SBAC), or another entropy coding methodology to the coefficients.

To perform CAVLC, the entropy encoding unit 56 may select a variable length code for a symbol to be transmitted. Codewords in VLC may be constructed such that relatively shorter codes correspond to more likely symbols, while longer codes correspond to less likely symbols. In this way, the use of VLC may achieve a bit savings over, for example, using equal-length codewords for each symbol to be transmitted.

To perform CABAC, the entropy encoding unit 56 may select a context model to apply to a certain context to encode symbols to be transmitted. The context may relate to, for example, whether neighboring values are non-zero or not. The entropy encoding unit 56 may also entropy encode syntax elements, such as the signal representative of the selected transform. In accordance with the techniques of this disclosure, the entropy encoding unit 56 may select the context model used to encode these syntax elements based on, for example, an intra-prediction direction for intra-prediction modes, a scan position of the coefficient corresponding to the syntax elements, block type, and/or transform type, among other factors used for context model selection.

Following the entropy coding by the entropy encoding unit 56, the resulting encoded video may be transmitted to another device, such as the video decoder 30, or archived for later transmission or retrieval.

In some cases, the entropy encoding unit 56 or another unit of the video encoder 20 may be configured to perform other coding functions, in addition to entropy coding. For example, the entropy encoding unit 56 may be configured to determine coded block pattern (CBP) values for CU's and PU's. Also, in some cases, the entropy encoding unit 56 may perform run length coding of coefficients.

The inverse quantization unit 58 and the inverse transform unit 60 apply inverse quantization and inverse transformation, respectively, to reconstruct the residual block in the pixel domain, e.g., for later use as a reference block. The motion compensation unit 44 may calculate a reference block by adding the residual block to a predictive block of one of the frames of the reference frame buffer 64. The motion compensation unit 44 may also apply one or more interpolation filters to the reconstructed residual block to calculate sub-integer pixel values for use in motion estimation. The summer 62 adds the reconstructed residual block to the motion compensated prediction block produced by the motion compensation unit 44 to produce a reconstructed video block for storage in the reference frame buffer 64. The reconstructed video block may be used by the motion estimation unit 42 and the motion compensation unit 44 as a reference block to inter-code a block in a subsequent video frame.

Figure 5:
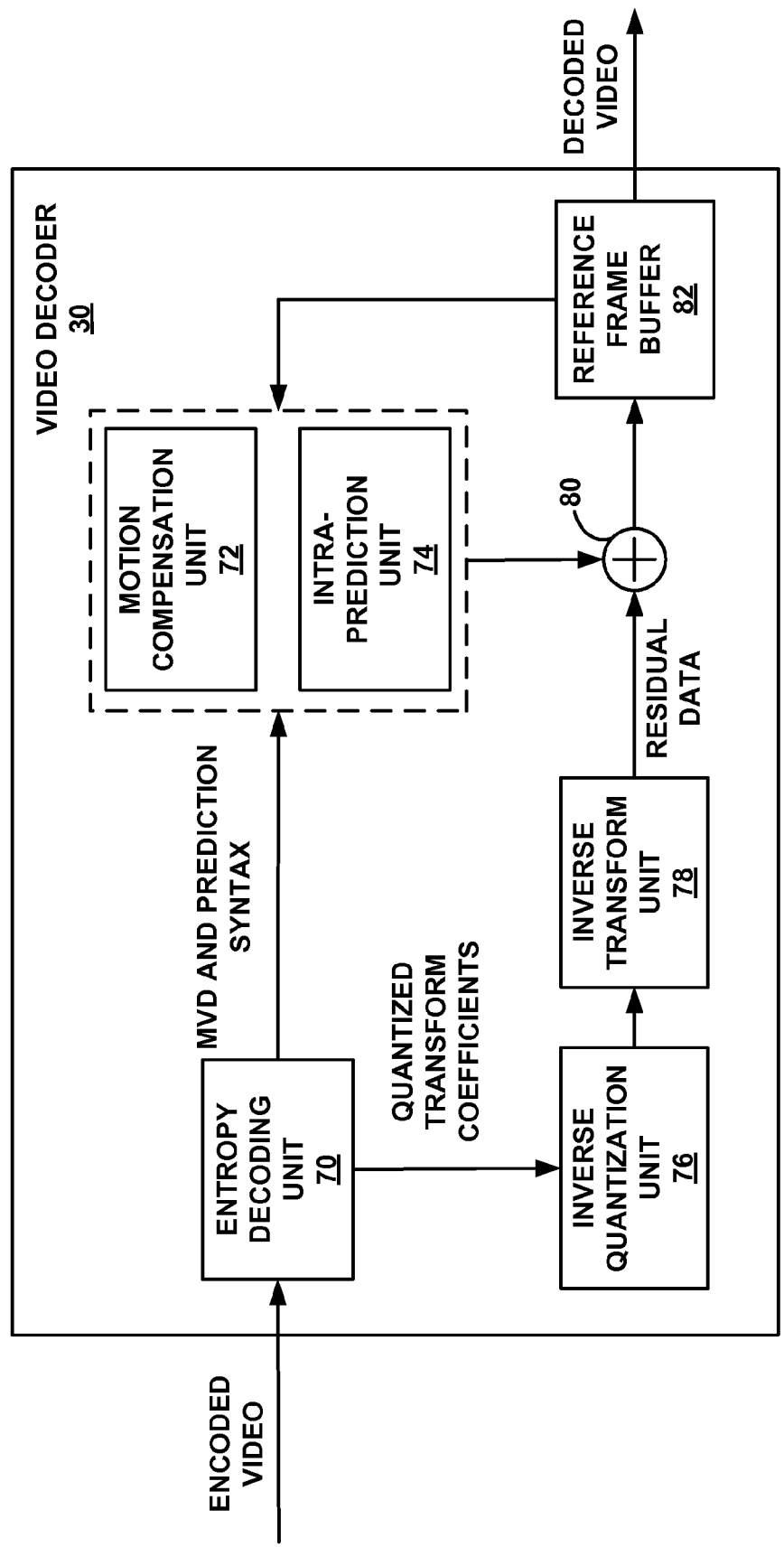
FIG. 5 is a block diagram illustrating an example video decoder.

FIG. 5 is a block diagram illustrating an example of a video decoder 30, which decodes an encoded video sequence. In the example of FIG. 5, the video decoder 30 includes an entropy decoding unit 70, a motion compensation unit 72, an intra-prediction unit 74, an inverse quantization unit 76, an inverse transformation unit 78, a reference frame buffer 82 and a summer 80. The video decoder 30 may, in some examples, perform a decoding pass generally reciprocal to the encoding pass described with respect to the video encoder 20 (see FIG. 4).

The entropy decoding unit 70 performs an entropy decoding process on the encoded bitstream to retrieve a one-dimensional array of transform coefficients. The entropy decoding process used depends on the entropy coding used by the video encoder 20 (e.g., CABAC, CAVLC, etc.). The entropy coding process used by the encoder may be signaled in the encoded bitstream or may be a predetermined process.

In some examples, the entropy decoding unit 70 (or the inverse quantization unit 76) may scan the received values using a scan mirroring the scanning mode used by the entropy encoding unit 56 (or the quantization unit 54) of the video encoder 20. Although the scanning of coefficients may be performed in the inverse quantization unit 76, scanning will be described for purposes of illustration as being performed by the entropy decoding unit 70. In addition, although shown as separate functional units for ease of illustration, the structure and functionality of the entropy decoding unit 70, the inverse quantization unit 76, and other units of the video decoder 30 may be highly integrated with one another.

The inverse quantization unit 76 inverse quantizes, i.e., de-quantizes, the quantized transform coefficients provided in the bitstream and decoded by the entropy decoding unit 70. The inverse quantization process may include a conventional process, e.g., similar to the processes proposed for HEVC or defined by the H.264 decoding standard. The inverse quantization process may include use of a quantization parameter QP calculated by the video encoder 20 for the CU to determine a degree of quantization and, likewise, a degree of inverse quantization that should be applied. The inverse quantization unit 76 may inverse quantize the transform coefficients either before or after the coefficients are converted from a one-dimensional array to a two-dimensional array.

The inverse transform unit 78 applies an inverse transform to the inverse quantized transform coefficients. In some examples, the inverse transform unit 78 may determine an inverse transform based on signaling from the video encoder 20, or by inferring the transform from one or more coding characteristics such as block size, coding mode, or the like. In some examples, the inverse transform unit 78 may determine a transform to apply to the current block based on a signaled transform at the root node of a quadtree for an LCU including the current block. Alternatively, the transform may be signaled at the root of a TU quadtree for a leaf-node CU in the LCU quadtree. In some examples, the inverse transform unit 78 may apply a cascaded inverse transform, in which inverse transform unit 78 applies two or more inverse transforms to the transform coefficients of the current block being decoded.

According to examples of this disclosure, the video decoder 30 may receive, from the encoded bitstream, signaling information that identifies the motion vector difference and other prediction syntax. The MVD and prediction syntax may be passed to the motion compensation unit 72 by the entropy decoding unit 70 or another unit of the video decoder 30.

The intra-prediction unit 74 may generate prediction data for a current block of a current frame based on a signaled intra-prediction mode and data from previously decoded blocks of the current frame.

In accordance with examples of this disclosure, the motion compensation unit 72 may generate prediction data based on MVDs and prediction syntax received from the entropy decoding unit 70. The motion compensation unit 72 receives the MVD and prediction syntax in the encoded bitstream. In the example of FIG. 2A, the prediction syntax includes an index identifying a candidate portion having the candidate motion vector used to create the signaled MVD. The motion compensation unit 72 may use this index to retrieve the candidate motion vector from memory associated with the signaled candidate portion (i.e., the index for the candidate portion). The motion vector may be stored in a memory, such as the reference frame buffer 82. The motion compensation unit 72 may then calculate the current motion vector for a current portion of the frame by adding the signaled MVD to the retrieved candidate motion vector. As was described above with reference FIG. 2A, in some examples an MVD of zero may be signaled as a flag rather than sending an MVD. In this circumstance, the motion compensation unit 72 would simply copy the candidate motion vector as the current motion vector.

The motion compensation unit 72 may also retrieve the motion prediction direction and reference index associated with the candidate portion. The reference prediction direction indicates whether the inter-prediction mode is uni-directional (e.g., a P frame) or bi-directional (a B frame). The reference index indicates which reference frame the candidate motion vector is based on. In other examples, such as shown in FIG. 2B, the reference frame index is signaled to the decoder and need not be retrieved.

Based on the retrieved motion prediction direction, reference frame index, and calculated current motion vector, the motion compensation unit produces a motion compensated block for the current portion. These motion compensated blocks essentially recreate the predictive block used to produce the residual data.

The motion compensation unit 72 may produce the motion compensated blocks, possibly performing interpolation based on interpolation filters. Identifiers for interpolation filters to be used for motion estimation with sub-pixel precision may be included in the syntax elements. The motion compensation unit 72 may use interpolation filters as used by the video encoder 20 during encoding of the video block to calculate interpolated values for sub-integer pixels of a reference block. The motion compensation unit 72 may determine the interpolation filters used by the video encoder 20 according to received syntax information and use the interpolation filters to produce predictive blocks.

Additionally, the motion compensation unit 72 and the intra-prediction unit 74, in an HEVC example, may use some of the syntax information (e.g., provided by a quadtree) to determine sizes of LCUs used to encode frame(s) of the encoded video sequence. The motion compensation unit 72 and the intra-prediction unit 74 may also use syntax information to determine split information that describes how each CU of a frame of the encoded video sequence is split (and likewise, how sub-CUs are split). The syntax information may also include modes indicating how each split is encoded (e.g., intra- or inter-prediction, and for intra-prediction an intra-prediction encoding mode), one or more reference frames (and/or reference lists containing identifiers for the reference frames) for each inter-encoded PU, and other information to decode the encoded video sequence.

The summer 80 combines the residual blocks with the corresponding prediction blocks generated by the motion compensation unit 72 or the intra-prediction unit 74 to form decoded blocks. If desired, a deblocking filter may also be applied to filter the decoded blocks in order to remove blockiness artifacts. The decoded video blocks are then stored in the reference frame buffer 82, which provides reference blocks for subsequent motion compensation and also produces decoded video for presentation on a display device (such as the display device 32 of FIG. 3).

As mentioned above, the techniques for motion vector prediction, motion compensation and motion estimation presented in this disclosure are applicable for both an encoder and a decoder. In general, and in accordance with the description above, an encoder may determine a candidate motion vector to use as a motion vector predictor for a current motion vector of a current portion of a video frame. The encoder signals a motion vector difference between the selected candidate motion vector and the current vector. The encoder also signals an index identifying the candidate portion having the selected candidate motion vector. A decoder may then retrieve a motion prediction direction and a reference frame index associated with the candidate portion and copy them for the current portion. The decoder also retrieves the candidate motion vector associated with the candidate portion and adds the signaled motion vector difference to the candidate motion vector to produce the current motion vector for the current portion. Predictive data may then be formed by the decoder through a motion compensation process using the current motion vector, motion vector prediction, and reference frame index.

Figure 6:
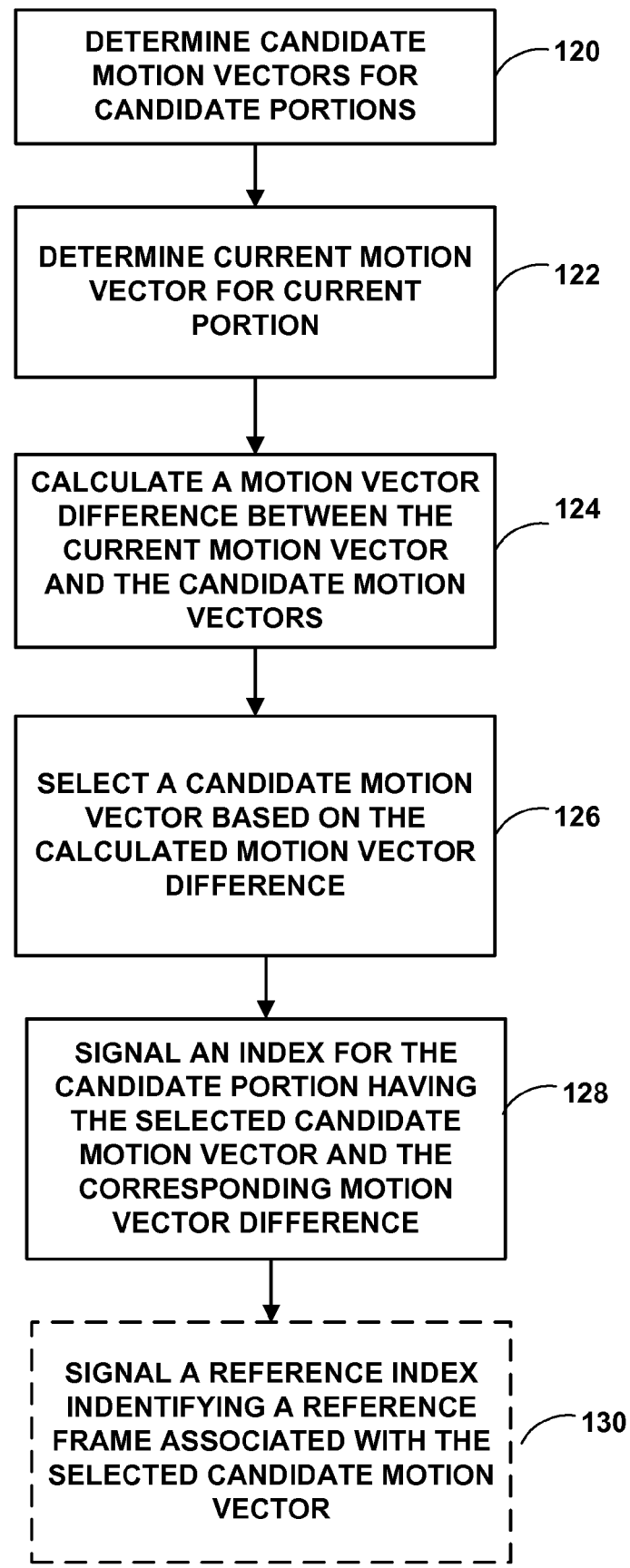
FIG. 6 is a flowchart illustrating an example method of encoding video.

FIG. 6 is a flowchart illustrating an example method of encoding video, which may be performed by a video encoder, such as the video encoder 20 of FIG. 4. A method of encoding video data determines a candidate motion vector for each of one or more candidate portions of a video frame (120). In one example, the candidate portions are portions adjacent to the current portion in the same frame. As discussed above, the candidate motion vectors may be motion vectors that were previously determined through a motion search process and stored in memory. Next, an encoder determines a current motion vector for a current portion of a current frame, wherein the current motion vector identifies a portion of a reference frame that at least partially matches the current portion of the current frame (122). Again, this process may be a motion search process.

A motion vector difference is calculated between the current motion vector and each of the candidate motion vectors (124). After calculating the MVDs, the encoder selects one of the candidate motion vectors based on the calculated motion vector differences (126). The candidate motion vector that is selected may be the candidate motion vector that produces the smallest motion vector difference. Once the candidate motion vector has been selected, the encoder signals, e.g., in an encoded bitstream, an index identifying the candidate portion having the selected one of the candidate motion vectors, and signals the corresponding motion vector difference calculated with respect to the selected one of the candidate motion vectors (128). The signaling of step 128 is applicable in the case where each of the candidate motion vectors refer to the same reference frame as the current motion vector.

In another optional example, at least one of the candidate motion vectors refers to a different reference frame than the current motion vector. In this case, the encoder may signal a reference index identifying a reference frame associated with the selected candidate motion vector (130).

In some examples, the selected one of the candidate motion vectors corresponds to a motion vector difference of zero. In that case, signaling the corresponding motion vector difference determined with respect to the selected one of the candidate motion vectors may include signaling a flag that indicates the motion vector difference rather than signaling the motion vector difference itself.

Figure 7:
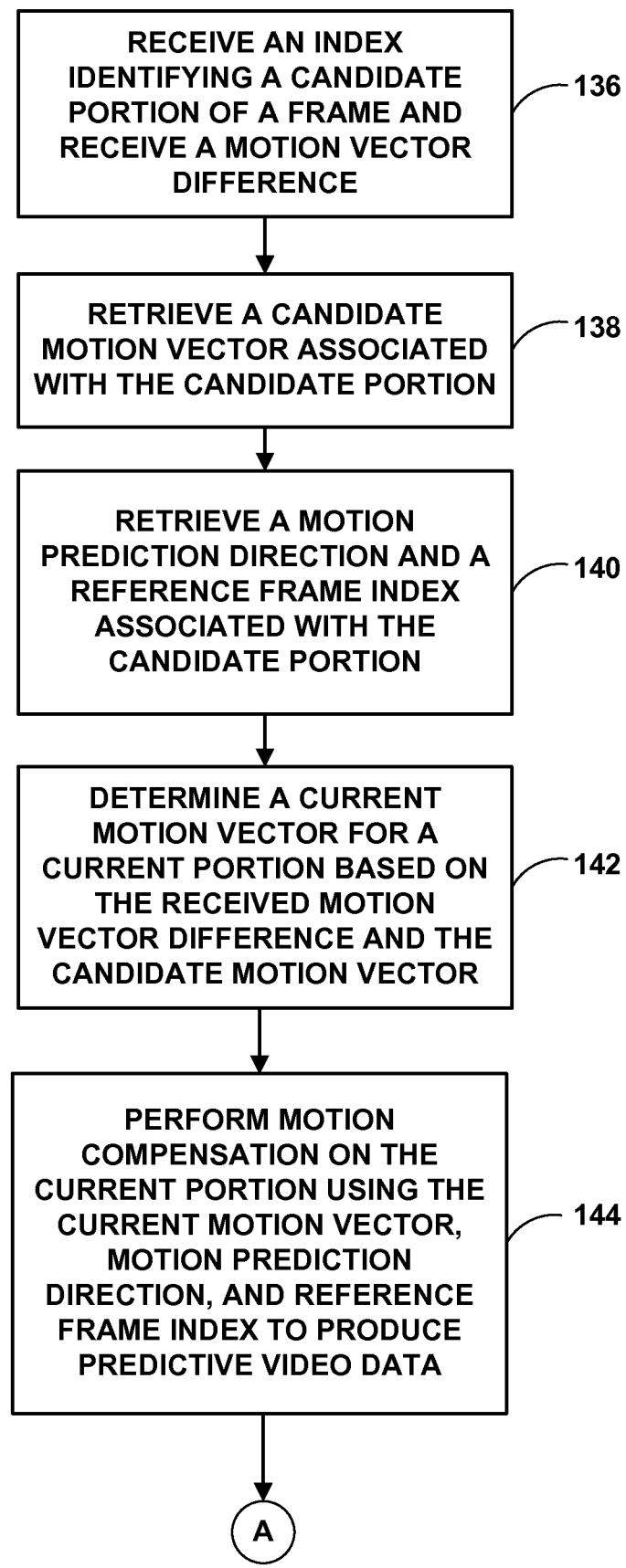
FIG. 7 is a flowchart illustrating an example method of decoding video.

FIG. 7 is a flowchart illustrating an example method of decoding video, which may be performed by a video decoder, such as the video decoder 30 of FIG. 5. A method of decoding video data includes receiving an index identifying a candidate portion of a frame and receiving a motion vector difference (136) and retrieving a candidate motion vector associated with the candidate portion (138). The candidate motion vector may be retrieved from memory for an already decoded candidate portion (i.e., a causal portion). In some examples, the received motion vector difference may be indicated by a flag that indicates that the motion vector difference is zero. A video decoder may also retrieve a motion prediction direction and a reference frame index associated with the candidate portion (140). A video decoder determines a current motion vector for a current portion of a current frame based on the received motion vector difference and the candidate motion vector (142). This may be accomplished by adding the motion vector difference to the candidate motion vector. The video decoder may then perform motion compensation on the current portion using the determined current motion vector, motion prediction direction and reference frame index to produce predictive video data (144).

Figure 8:
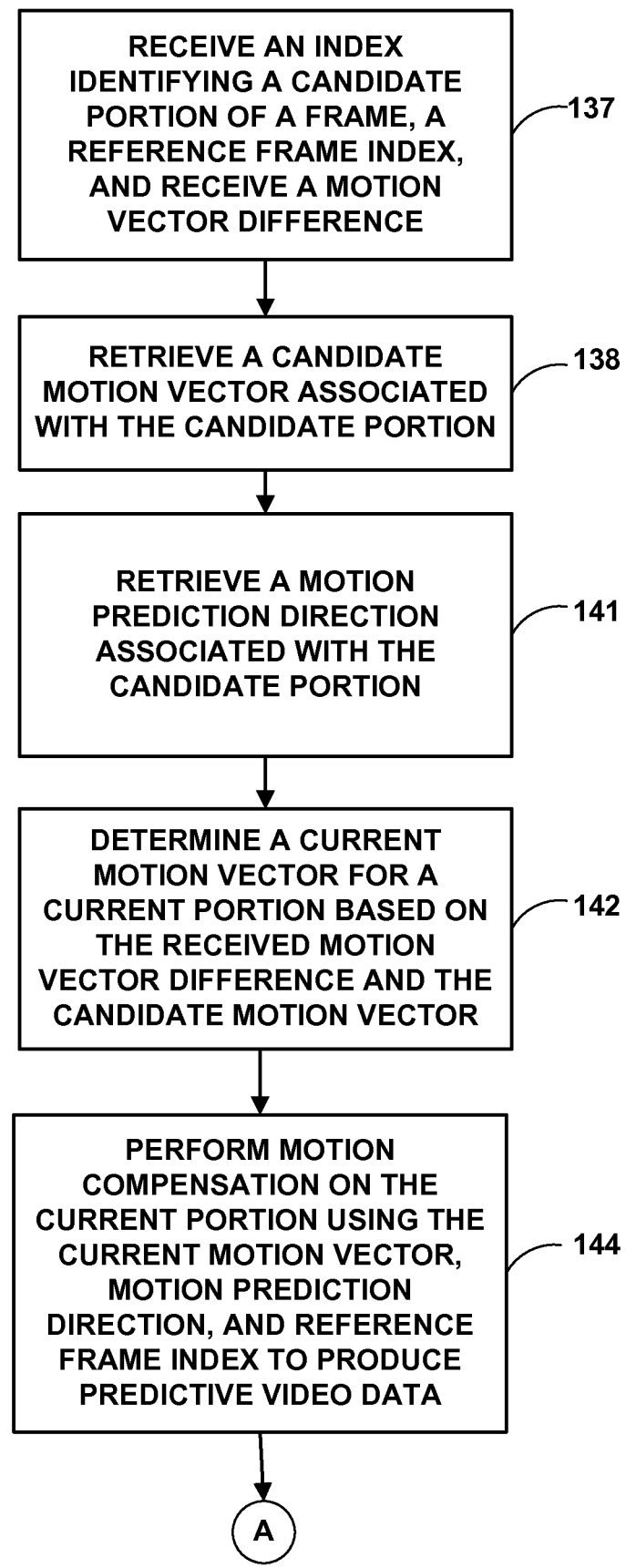
FIG. 8 is a flowchart illustrating another example method of decoding video.

FIG. 8 is a flowchart illustrating an example method of decoding video that is a slight variation to the method shown in FIG. 7. In the example of FIG. 8, the video decoder receives a reference frame index along with the motion vector difference and the index identifying a candidate portion of a frame (137). As such, only the motion vector (138) and motion prediction direction (141) need be retrieved.

Figure 9:
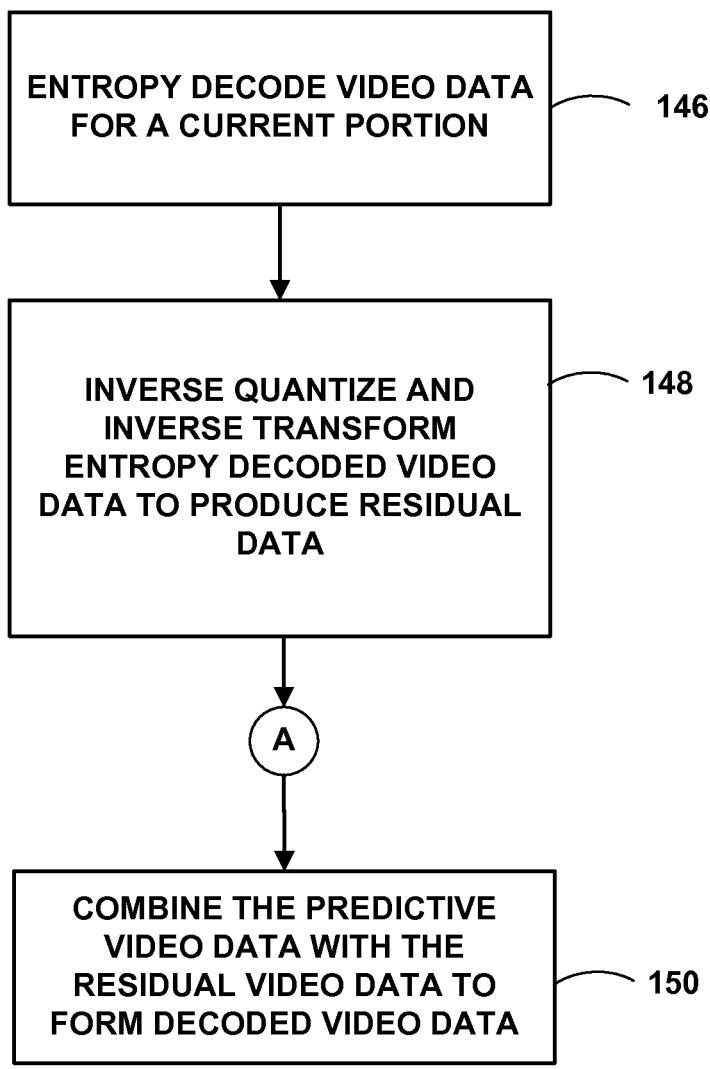
FIG. 9 is a flowchart illustrating another example method of decoding video.

FIG. 9 is a flowchart illustrating another example method of decoding video. Before or in parallel with methods shown in FIGS. 7-8, a video decoder may entropy decode video data for a current portion (146) and inverse quantize and inverse transform entropy decoded video data to produce residual data (148). Once the predictive data is generated by the methods shown in FIG. 7 or FIG. 8, the video decoder combines the predictive video data with the residual video data to form decoded video data (150).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding video data, the method comprising:
   determining a candidate motion vector for a motion vector prediction process for each of one or more candidate portions of a current video frame, wherein the one or more candidate portions are causal to a current portion of the current video frame;
   determining a current motion vector for the current portion;
   determining whether each of the candidate motion vectors and the current motion vector refer to the same reference video frame; and
   performing the motion vector prediction process in the case that each of the candidate motion vectors and the current motion vector are determined to refer to the same reference video frame, whereby signaling of a reference index indicating the reference video frame is avoided by inferring the reference index from the candidate motion vectors of the one or more candidate portions at a video decoder, the motion vector prediction process comprising:
   calculating a motion vector difference between the current motion vector and each of the candidate motion vectors;
   selecting one of the candidate motion vectors based on the calculated motion vector differences;
   not signaling the reference index;
   signaling an index identifying the candidate portion having the selected one of the candidate motion vectors; and
   signaling the motion vector difference calculated with respect to the selected one of the candidate motion vectors.

2. The method of claim 1, wherein the one or more candidate portions are in the current video frame.

3. The method of claim 2, wherein the candidate portions are adjacent to the current portion.

4. The method of claim 1, wherein if the motion vector difference associated with the selected one of the candidate motion vectors corresponds to a motion vector difference of zero, the method further comprises signaling the corresponding motion vector difference determined with respect to the selected one of the candidate motion vectors comprises signaling a flag indicating the motion vector difference of zero.

5. The method of claim 1, wherein selecting one of the candidate motion vectors based on the calculated motion vector differences comprises selecting the candidate motion vector with the smallest calculated motion vector difference.

6. A method of decoding video data, the method comprising:
   performing a motion vector prediction process in the case that each of a plurality of candidate motion vectors and a current motion vector refers to the same reference video frame, whereby reception of a reference index indicating the reference video frame is avoided, the motion vector prediction process comprising:
   receiving an index identifying a candidate portion of a current video frame, wherein the candidate portion is causal to a current portion of the current video frame;
   receiving a motion vector difference;
   retrieving a candidate motion vector associated with the candidate portion;
   retrieving a motion prediction direction and the reference frame index associated with the candidate portion without receiving the reference frame index for the current portion;
   determining the current motion vector for the current portion based on the received motion vector difference and the candidate motion vector; and
   performing motion compensation on the current portion using the determined current motion vector, the retrieved motion prediction direction, and the retrieved reference frame index to produce predictive video data.

7. The method of claim 6, further comprising:
   entropy decoding video data for the current portion;
   inverse quantizing and inverse transforming the entropy decoded video data to produce residual data; and
   combining the predictive video data and the residual data to form decoded video data.

8. The method of claim 6, wherein the received motion vector difference is a flag indicating a zero motion vector difference, and wherein determining the current motion vector for the current portion of the current video frame comprises copying the candidate motion vector associated with the candidate portion.

9. An apparatus comprising:
a memory configured to store a current video frame; and
a video encoder in communication with the memory, the video encoder configured to:
determine a candidate motion vector for a motion vector prediction process for each of one or more candidate portions of a current video frame, wherein the one or more candidate portions are causal to a current portion of the current video frame;
determine a current motion vector for the current portion;
determine whether each of the candidate motion vectors and the current motion vector refer to the same reference video frame;
perform the motion vector prediction process in the case that each of the candidate motion vectors and the current motion vector are determined to refer to the same reference video frame, whereby signaling of a reference index indicating the reference video frame is avoided by inferring the reference index from the candidate motion vectors of the one or more candidate portions at a video decoder, the video encoder further configured to:
calculate a motion vector difference between the current motion vector and each of the candidate motion vectors;
select one of the candidate motion vectors based on the calculated motion vector differences;
not signal the reference index;
signal an index identifying the candidate portion having the selected one of the candidate motion vectors; and
signal the motion vector difference calculated with respect to the selected one of the candidate motion vectors.

10. The apparatus of claim 9, wherein the one or more candidate portions are in the current video frame.

11. The apparatus of claim 10, wherein the candidate portions are adjacent to the current portion.

12. The apparatus of claim 9, wherein if the motion vector difference associated with the selected one of the candidate motion vectors corresponds to a motion vector difference of zero, the video encoder is configured to signal the motion vector difference as a flag indicating the motion vector difference of zero.

13. The apparatus of claim 9, wherein the video encoder is further configured to select the candidate motion vector with the smallest calculated motion vector difference.

14. An apparatus comprising:
a memory configured to store a current video frame; and
a video decoder in communication with the memory, the video decoder configured to perform a motion vector prediction process in the case that each of a plurality of candidate motion vectors and a current motion vector refers to the same reference video frame, whereby reception of a reference index indicating the reference video frame is avoided, the video decoder further configured to:
receive an index identifying a candidate portion of the current video frame, wherein the candidate portion is causal to a current portion of the current video frame;
receive a motion vector difference;
retrieve a candidate motion vector associated with the candidate portion;
retrieve a motion prediction direction and the reference frame index associated with the candidate portion without receiving the reference frame index for the current portion;
determine the current motion vector for the current portion based on the received motion vector difference and the candidate motion vector; and
perform motion compensation on the current portion using the determined current motion vector, the retrieved motion prediction direction, and the retrieved reference frame index to produce predictive video data.

15. The apparatus of claim 14, wherein the video decoder is further configured to:
entropy decode video data for the current portion;
inverse quantize and inverse transform the entropy decoded video data to produce residual data; and
combine the predictive video data and the residual data to form decoded video data.

16. The apparatus of claim 14, wherein the received motion vector difference is a flag indicating a zero motion vector difference, and wherein the video decoder is further configured to determine the current motion vector for the current portion of the current video frame by copying the candidate motion vector associated with the candidate portion.

17. An apparatus configured to encode video data, the apparatus comprising:
means for determining a candidate motion vector for a motion vector prediction process for each of one or more candidate portions of a current video frame, wherein the one or more candidate portions are causal to a current portion of the current video frame;
means for determining a current motion vector for the current portion;
means for determining whether each of the candidate motion vectors and the current motion vector refer to the same reference video frame;
means for performing the motion vector prediction process in the case that each of the candidate motion vectors and the current motion vector are determined to refer to the same reference video frame without signaling a reference index, whereby signaling of the reference index indicating the reference video frame is avoided by inferring the reference index from the candidate motion vectors of the one or more candidate portions at a video decoder, the means for performing the motion vector prediction process comprising:
means for calculating a motion vector difference between the current motion vector and each of the candidate motion vectors;
means for selecting one of the candidate motion vectors based on the calculated motion vector differences;
means for signaling an index identifying the candidate portion having the selected one of the candidate motion vectors; and
means for signaling the motion vector difference calculated with respect to the selected one of the candidate motion vectors.

18. The apparatus of claim 17, wherein the one or more candidate portions are in the current video frame.

19. The apparatus of claim 18, wherein the candidate portions are adjacent to the current portion.

20. The apparatus of claim 17, wherein if the motion vector difference associated with the selected one of the candidate motion vectors corresponds to a motion vector difference of zero, the means for signaling the corresponding motion vector difference determined with respect to the selected one of the candidate motion vectors comprises means for signaling a flag indicating the motion vector difference of zero.

21. The apparatus of claim 17, wherein the means for selecting one of the candidate motion vectors based on the calculated motion vector differences comprises means for selecting the candidate motion vector with the smallest calculated motion vector difference.

22. An apparatus configured to decode video data, the apparatus comprising:
means for performing a motion vector prediction process in the case that each of a plurality of candidate motion vectors and a current motion vector refers to the same reference video frame, whereby reception of a reference index indicating the reference video frame is avoided, the means for performing the motion vector prediction process comprising:
means for receiving an index identifying a candidate portion of a current video frame, wherein the candidate portion is causal to a current portion of the current video frame;
means for receiving a motion vector difference;
means for retrieving a candidate motion vector associated with the candidate portion;
means for retrieving a motion prediction direction and the reference frame index associated with the candidate portion without receiving the reference frame index for the current portion;
means for determining the current motion vector for the current portion based on the received motion vector difference and the candidate motion vector; and
means for performing motion compensation on the current portion using the determined current motion vector, the retrieved motion prediction direction, and the retrieved reference frame index to produce predictive video data.

23. The apparatus of claim 22, further comprising:
means for entropy decoding video data for the current portion;
means for inverse quantizing and inverse transforming the entropy decoded video data to produce residual data; and
means for combining the predictive video data and the residual data to form decoded video data.

24. The apparatus of claim 22, wherein the received motion vector difference is a flag indicating a zero motion vector difference, and wherein the means for determining the current motion vector for the current portion of the current video frame comprises means for copying the candidate motion vector associated with the candidate portion.

25. A non-transitory computer-readable storage medium having stored thereon instructions that, when executed, cause one or more processors of a device for encoding video data to:
determine a candidate motion vector for a motion vector prediction process for each of one or more candidate portions of a current video frame, wherein the one or more candidate portions are causal to a current portion of the current video frame;
determine a current motion vector for the current portion;
determine whether each of the candidate motion vectors and the current motion vector refer to the same reference video frame;
perform the motion vector prediction process in the case that each of the candidate motion vectors and the current motion vector are determined to refer to the same reference video frame, whereby signaling of a reference index indicating the reference video frame is avoided by inferring the reference index from the candidate motion vectors of the one or more candidate portions at a video decoder, the motion vector prediction process further causing the processor to:
calculate a motion vector difference between the current motion vector and each of the candidate motion vectors;
select one of the candidate motion vectors based on the calculated motion vector differences;
not signal the reference index;
signal an index identifying the candidate portion having the selected one of the candidate motion vectors; and
signal the motion vector difference calculated with respect to the selected one of the candidate motion vectors.

26. The non-transitory computer-readable storage medium of claim 25, wherein the one or more candidate portions are in the current video frame.

27. The computer program product of claim 26, wherein the candidate portions are adjacent to the current portion.

28. The non-transitory computer-readable storage medium of claim 25, wherein if the motion vector difference associated with the selected one of the candidate motion vectors corresponds to a motion vector difference of zero, the non-transitory computer-readable storage medium further including instructions that cause the one or more processors to signal the motion vector difference as a flag indicating the motion vector difference of zero.

29. The non-transitory computer-readable storage medium of claim 25, further including instructions that cause the one or more processors to select the candidate motion vector with the smallest calculated motion vector difference.

30. A non-transitory computer-readable storage medium having stored thereon instructions that, when executed, cause one or more processors of a device for decoding video data to:
perform a motion vector prediction process in the case that each of a plurality of candidate motion vectors and a current motion vector refers to the same reference video frame, whereby reception of a reference index indicating the reference video frame is avoided, the motion vector prediction process comprising further causing the processor to:
receive an index identifying a candidate portion of a current video frame, wherein the candidate portion is causal to a current portion of the current video frame;
receive a motion vector difference;
retrieve a candidate motion vector associated with the candidate portion;
retrieve a motion prediction direction and the reference frame index associated with the candidate portion without receiving the reference frame index for the current portion;
determine the current motion vector for the current portion based on the received motion vector difference and the candidate motion vector; and
perform motion compensation on the current portion using the determined current motion vector, the retrieved motion prediction direction, and the retrieved reference frame index to produce predictive video data.

31. The non-transitory computer-readable storage medium of claim 30, further including instructions that cause the one or more processors to:
   entropy decode video data for the current portion;
   inverse quantize and inverse transform the entropy decoded video data to produce residual data; and
   combine the predictive video data and the residual data to form decoded video data.

32. The non-transitory computer-readable storage medium of claim 30, wherein the received motion vector difference is a flag indicating a zero motion vector difference, and further including instructions that cause the one or more processors to determine the current motion vector for the current portion of the current video frame by copying the candidate motion vector associated with the candidate portion.

* * * * *